United States Patent [19]

Tzikas et al.

[11] Patent Number: 5,393,306
[45] Date of Patent: Feb. 28, 1995

[54] DYE MIXTURES, PROCESSES FOR THEIR PREPARATION AND THEIR USE

[75] Inventors: Athanassios Tzikas, Pratteln; Claudia Carisch, Reinach, both of Switzerland

[73] Assignee: Ciba-Geigy Corporation, Ardsley, N.Y.

[21] Appl. No.: 94,644

[22] Filed: Jul. 19, 1993

[51] Int. Cl.$^6$ ............................................. C09B 62/00
[52] U.S. Cl. ............................................. 8/543; 8/549; 8/639; 8/641; 8/681; 8/687; 8/688; 8/689
[58] Field of Search .................... 8/543, 549, 638, 639, 8/641, 681, 687–689

[56] References Cited

U.S. PATENT DOCUMENTS

| | | | |
|---|---|---|---|
| 3,974,123 | 8/1976 | Dehnert et al. | 260/40 |
| 4,033,943 | 7/1977 | Ramanathan et al. | 260/153 |
| 4,473,499 | 9/1984 | Niwa | 260/153 |
| 5,106,960 | 4/1992 | Hurter | 534/641 |

FOREIGN PATENT DOCUMENTS

| | | |
|---|---|---|
| 0043575 | 1/1982 | European Pat. Off. |
| 2438130 | 2/1976 | Germany |
| 2454492 | 5/1976 | Germany |
| 58-101158 | 6/1983 | Japan |
| 1377505 | 12/1974 | United Kingdom |
| 1377506 | 12/1974 | United Kingdom |
| 1419330 | 12/1975 | United Kingdom |
| 2142926 | 1/1985 | United Kingdom |

OTHER PUBLICATIONS

Chemical Abstract, 100:8494t, 1984.

*Primary Examiner*—Paul Lieberman
*Assistant Examiner*—Margaret Einsmann
*Attorney, Agent, or Firm*—Kevin T. Mansfield

[57] ABSTRACT

Dye mixtures which comprise a reactive dye of the formula

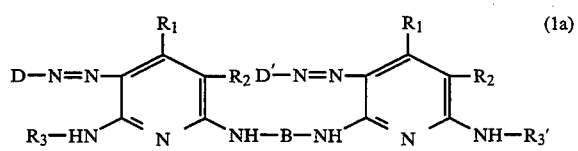

together with at least one reactive dye of the formulae

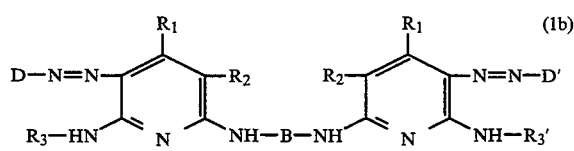

and

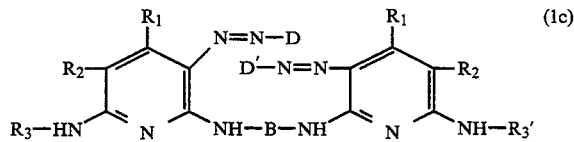

in which D, D', $R_1$, $R_2$, $R_3$, $R_3'$ and B are as defined in claim 1, are particularly suitable for dyeing or printing cellulosic fibre materials or naturally occurring or synthetic polyamide fibre materials with a high tinctorial yield, and produce dyeings and prints having good fastness properties.

10 Claims, No Drawings

DYE MIXTURES, PROCESSES FOR THEIR PREPARATION AND THEIR USE

The present invention relates to novel mixtures of reactive dyes, processes for their preparation and their use for dyeing or printing fibre materials.

The practice of dyeing using reactive dyes has recently led to increased requirements of the quality of the dyeings and the profitability of the dyeing process. Consequently, there continues to be a need for novel reactive dyes which have improved properties, in particular in respect of application.

Reactive dyes which have an adequate substantivity and at the same time a good ease of washing off of the non-fixed portions are now required for dyeing. They furthermore should have a good tinctoffal yield and high reactivity, and in particular dyeings having high degrees of fixing should be produced. These requirements are not met in all their properties by the known dyes.

The present invention is therefore based on the object of discovering novel improved reactive dyes or mixtures of reactive dyes which are used for dyeing and printing fibre materials and have the qualities characterised above to a high degree. The novel dyes or dye mixtures should be distinguished in particular by high fixing yields and high fibre-dye bond stabilities, and moreover the portions not fixed to the fibre should be easy to wash off. They should furthermore produce dyeings having good all-round fastness properties, for example fastnesses to light and wet processing.

It has been found that the object described can be largely achieved by the novel mixtures of reactive dyes as defined below.

The invention therefore relates to dye mixtures which comprise a reactive dye of the formula

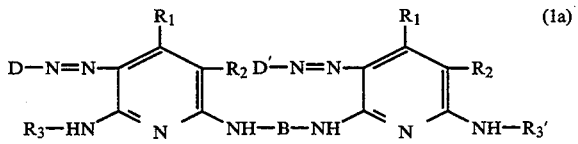

together with at least one reactive dye of the formulae

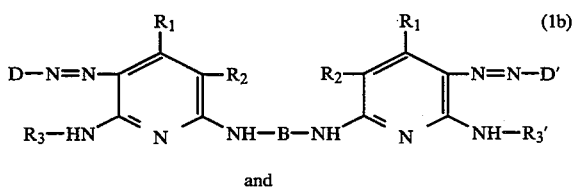

and

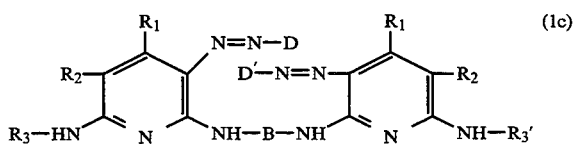

in which D and D' independently of one another are the radical of a diazo component of the benzene or naphthalene series or the radical of a mono- or disazo dye, $R_1$ is $C_1$-$C_4$alkyl, $R_2$ is cyano, carbamoyl or sulfomethyl, $R_3$ and $R_3'$ independently of one another are hydrogen or $C_1$-$C_{12}$alkyl which is substituted or unsubstituted and, with the exception of methyl, may be interrupted by oxygen and B is $C_2$-$C_{12}$alkylene which is substituted or unsubstituted and may be interrupted by oxygen, and the reactive dyes of the formulae (1a), (1b) and (1c) in each case contain at least one fibre-reactive radical.

Examples of substituents in the radical D and D' are: alkyl groups having 1 to 12 carbon atoms, in particular 1 to 4 carbon atoms, such as methyl, ethyl, propyl, isopropyl or butyl, alkyl which is further substituted by $C_1$-$C_4$alkoxy or hydroxyl, alkoxy groups having 1 to 8 carbon atoms, in particular 1 to 4 carbon atoms, such as methoxy, ethoxy, propoxy, isopropoxy or butoxy, alkanoylamino groups having 2 to 8 carbon atoms, in particular 2 to 4 carbon atoms, such as acetylamino or propionylamino, phenyl- or naphthylamino, alkoxycarbonylamino groups having 2 to 8 carbon atoms, in particular 2 to 4 carbon atoms, alkanoyl groups having 2 to 8 carbon atoms, in particular 2 to 4 carbon atoms, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, alkoxycarbonyl having 1 to 4 carbon atoms in the alkoxy radical, such as methoxycarbonyl or ethoxycarbonyl, benzoyl, benzoylamino which is unsubstituted or substituted by $C_1$-$C_4$alkyl on the nitrogen, phenyl, naphthyl, amino, amino which is mono- or disubstituted by $C_1$-$C_{12}$alkyl, phenyl or naphthyl, trifluoromethyl, nitro, cyano, hydroxyl, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-($\beta$-hydroxyethyl) sulfamoyl, N,N-di-($\beta$-hydroxyethyl) sulfamoyl, N-phenylsulfamoyl, ureido, carboxyl, sulfomethyl, sulfo or sulfato and fibre-reactive radicals, in which the substituents containing an alkyl, phenyl or naphthyl radical can be further substituted in the alkyl, phenyl or naphthyl radical, such as, for example by the substituents mentioned above for D and D'. The alkyl radicals furthermore can be interrupted by oxygen (—O—).

Fibre-reactive radicals are to be understood as meaning those which are capable of reacting with the hydroxyl groups of cellulose, the amino, carboxyl, hydroxyl and thiol groups of wool and silk or the amino groups and any carboxyl groups of synthetic polyamides to form covalent chemical bonds. The fibre-reactive radicals as a rule are bonded to the dye radical directly or via a bridge member. Suitable fibre-reactive radicals are, for example, those which contain at least one substituent which can be removed on an aliphatic, aromatic or heterocyclic radical, or in which the radicals mentioned contain a radical which is suitable for reaction with the fibre material, for example a vinyl radical.

The reactive dyes of the formulae (1a), (1b) and (1c) preferably contain at least two fibre-reactive radicals, in particular 2 or 4 fibre-reactive radicals.

Fibre-reactive radicals in the reactive dyes of the formulae (1a), (1b) and (1c), which are preferably bonded to the radical D or D', are, for example:

a) reactive radicals of the formulae $$—SO_2—Z \qquad (2a),$$

$$-W-alk-SO_2-Z, \quad (2b)$$
$$\quad\;\;|$$
$$\quad\;\;R$$

$$-W-alk-E-alk'-SO_2-Z, \quad (2c)$$

$$-alk-W-alk'-SO_2-Z, \quad (2d)$$
$$\qquad\;\;|$$
$$\qquad\;\;R$$

$$-O-alk-W-alk'-SO_2-Z, \quad (2e)$$
$$\qquad\qquad\;\;|$$
$$\qquad\qquad\;\;R$$

$$-W-arylene-N-alk-SO_2-Z \text{ or} \quad (2f)$$
$$\qquad\qquad\;\;|\quad\;\;|$$
$$\qquad\qquad\;R_4\;\;R$$

$$-NH-CO-Z_1, \quad (2g)$$

in which W is a group of the formula $-SO_2-NR_4-$, $-CONR_4$ or $-NR_4CO-$, $R_4$ is hydrogen, $C_1-C_4$alkyl which is unsubstituted or substituted by hydroxyl, sulfo, sulfato, carboxyl or cyano, or a radical of the formula $$-alk-SO_2-Z,$$
$$\;\;|$$
$$\;\;R$$

R is hydrogen, hydroxyl, sulfo, sulfato, carboxyl, cyano, halogen, $C_1-C_4$alkoxycarbonyl, $C_1-C_4$alkanoyloxy, carbamoyl or the group $-SO_2-Z$, Z is a group of the formula $-CH=CH_2$ or $-CH_2-CH_2-U_1$ and $U_1$ is a leaving group $Z_1$ is a group of the formula

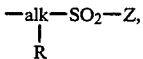

Hal is halogen, E is the radical $-O-$ or $-NR_5-$ and $R_5$ is hydrogen or $C_1-C_4$alkyl, alk and alk' independently of one another are $C_1-C_6$alkylene and arylene is a phenylene or naphthylene radical which is unsubstituted or substituted by sulfo, carboxyl, $C_1-C_4$alkyl, $C_1-C_4$alkoxy or halogen;

b) reactive radicals of the halotriazine or halopyrimidine series, in particular those of the formulae

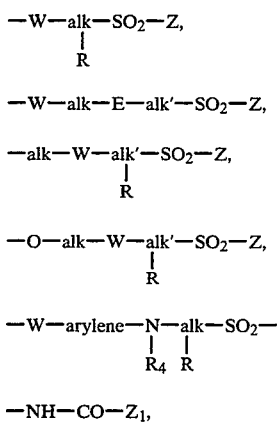

in which R' is hydrogen or $C_1-C_4$alkyl which is unsubstituted or substituted by hydroxyl, sulfo, sulfato, carboxyl or cyano, X is a group which can be removed as an anion and T is a group which can be removed as an anion or is a non-reactive radical or a reactive radical of the formula

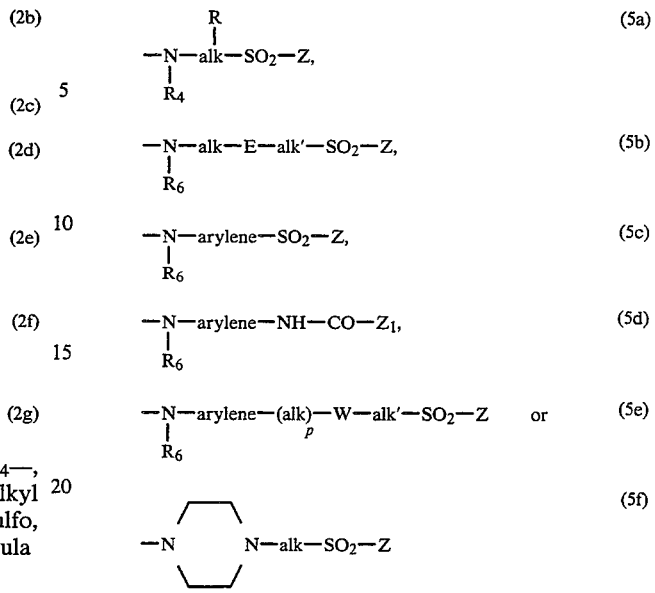

in which R, $R_4$, E, W, Z, $Z_l$, alk, alk' and arylene are as defined above, $R_6$ is hydrogen or $C_1-C_4$alkyl and p is 0 or 1, one of the radicals $X_1$ is a group which can be removed as an anion and the other radical $X_1$ is a non-reactive substituent or a radical of the formulae (5a) to (5f) or a group which can be removed as an anion and $X_2$ is a negative substituent.

Suitable leaving groups $U_1$ are, for example, $-Cl$, $-Br$, $-F$, $-OSO_3H$, $-SSO_3H$, $-OCO-CH_3$, $-O-PO_3H_2$, $-OCO-CCl_3$, $-OCO-CHCl_2$, $-O-CO-CH_2Cl$, $-OSO_2-C_1-C_4$alkyl, $-OSO_2-N(-C_1-C_4$alkyl$)_2$ or $-OCO-C_6H_5$.

$U_1$ is preferably a group of the formula $-Cl$, $-OSO_3H$, $-SSO_3H$, $-OCO-CH_3$, $-OCO-C_6H_5$ or $-OPO_3H_2$, in particular $-Cl$ or $-OSO_3H$, preferably $-OSO_3H$.

alk and alk' independently of one another are, for example, a methylene, ethylene, 1,3-propylene, 1,4-butylene, 1,5-pentylene or 1,6-hexylene radical or branched isomers thereof.

alk and alk' are preferably a $C_1-C_4$alkylene radical, and particularly preferably an ethylene radical.

Arylene is preferably a 1,3- or 1,4-phenylene radical, which is unsubstituted or substituted, for example, by sulfo, methyl, methoxy or carboxyl.

R is preferably hydrogen.

$R_4$ is preferably hydrogen or $C_1-C_4$alkyl, such as methyl, ethyl, propyl, isopropyl, butyl, isobutyl, sec-butyl or tert-butyl. $R_4$ is particularly preferably hydrogen.

$R_6$ is preferably hydrogen, methyl or ethyl, in particular hydrogen.

E is preferably $-NH-$ or $-O-$, and particularly preferably $-O-$.

W is preferably a group of the formula $-CONH-$ or $-NHCO-$, in particular a group of the formula $-CONH-$.

Hal in the radical $Z_1$ is preferably chlorine or, in particular, bromine.

Preferred reactive radicals of the formulae (2a) to (2g) are those in which W is a group of the formula $-CONH-$ or $-NHCO-$, R and $R_4$ are hydrogen, E is the radical $-O-$ or $-NH-$, Hal is chlorine or bromine and $U_1$ is a group of the formula —Cl, —OSO$_3$H, —SSO$_3$H, —OCO—CH$_3$, —OCO—C$_6$H$_5$ or —OPO$_3$H$_2$, in particular a group of the formula —Cl or —OSO$_3$H.

R' is preferably hydrogen or C$_1$-C$_4$alkyl which is unsubstituted or substituted by hydroxyl, sulfo or sulfato.

R' is preferably hydrogen or C$_1$-C$_4$alkyl, in particular hydrogen.

X is, for example, halogen, such as fluorine, chlorine or bromine, sulfo, C$_1$-C$_4$alkylsulfonyl or phenylsulfonyl, and preferably halogen, in particular fluorine or chlorine.

A group T which can be removed as an anion is, for example, halogen, such as fluorine, chlorine or bromine, sulfo, C$_1$-C$_4$alkylsulfonyl or phenylsulfonyl, and preferably halogen, in particular fluorine or chlorine.

A non-reactive radical T can be, for example, hydroxyl, C$_1$-C$_4$alkoxy, C$_1$-C$_4$alkylthio, morpholino or substituted or unsubstituted amino. Substituted or unsubstituted amino T is unsubstituted amino or, for example, N—C$_1$-C$_4$alkylamino or N,N-di-C$_1$-C$_4$alkylamino, in which the alkyl is unsubstituted or substituted, for example, by sulfo, sulfato, hydroxyl, carboxyl or phenyl, cyclohexylamino, N-C$_1$-C$_4$alkyl-N-phenylamino or phenylamino or naphthylamino, in which the phenyl or naphthyl is unsubstituted or substituted, for example, by C$_1$-C$_4$alkyl, C$_1$-C$_4$alkoxy, C$_2$-C$_4$alkanoylamino, carboxyl, sulfo or halogen.

Examples of suitable non-reactive radicals T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive radical T is preferably C$_1$-C$_4$alkoxy, C$_1$-C$_4$alkylthio, hydroxyl, amino, N—C$_1$-C$_4$alkylamino, which is unsubstituted or substituted, in the alkyl part, by hydroxyl, sulfato or sulfo, morpholino, phenylamino or N—C$_1$-C$_4$alkyl-N-phenylamino, in which the phenyl in each case is unsubstituted or substituted by sulfo, carboxyl, acetylamino, methyl or methoxy.

Particularly preferred non-reactive radicals T are C$_1$-C$_4$alkoxy, morpholino, phenylamino or N—C$_1$-C$_4$alkyl-N-phenylamino, in which the phenyl in each case is unsubstituted or substituted by sulfo, carboxyl, acetylamino, methyl or methoxy.

Reactive radicals T are preferably radicals of the formulae (5a) to (5f) in which R, R$_4$, R$_6$, E, W, Z, Z$_1$, alk, alk' and arylene are as defined as preferred above.

Preferred reactive radicals T are those of the formula (5a) to (5f) in which W is a group of the formula —CONH— or —NHCO—, R, R$_4$ and R$_6$ are hydrogen, E is the radical —O— or —NH—, Hal is chlorine or bromine and $U_1$ is a group of the formula —Cl, —OSO$_3$H, —SSO$_3$H, —OCO—CH$_3$, —OCO—C$_6$H$_5$ or —OPO$_3$H$_2$, in particular a group of the formula —Cl or —OSO$_3$H.

Especially preferred reactive radicals T are those of the formulae (5a) to (5f) in which W is a group of the formula —CONH—, R, R$_4$ and R$_6$ are hydrogen, E is the radical —O—, Hal chlorine or bromine and $U_1$ is a group of the formula —Cl or —OSO$_3$H, in particular a group of the formula —OSO$_3$H.

T is preferably halogen, hydroxyl, sulfo, C$_1$-C$_4$alkoxy, C$_1$-C$_4$alkylthio, C$_1$-C$_4$alkylsulfonyl, phenylsulfonyl, morpholino, substituted or unsubstituted amino or a reactive radical of the formulae (5a) to (5f) which are as defined and as preferred above.

T is particularly preferably chlorine, fluorine, C$_1$-C$_4$alkoxy, morpholino or N—C$_1$-C$_4$alkyl-N-phenylamino or phenylamino, in which the phenyl in each case is unsubstituted or substituted by sulfo, carboxyl, acetylamino, methyl or methoxy, or a reactive radical of the formulae (5a) to (5f), which are as defined and as preferred above.

The radical $X_1$ which can be removed as an anion is preferably halogen, in particular fluorine or chlorine.

A non-reactive substituent $X_1$ is, for example, as defined and as preferred above for a non-reactive substituent T.

The radical $X_1$ is particularly preferably halogen, in particular fluorine or chlorine.

Examples of suitable radicals $X_2$ are nitro, cyano, C$_1$-C$_4$alkylsulfonyl, carboxyl, chlorine, hydroxyl, C$_1$-C$_4$alkoxysulfonyl, C$_1$-C$_4$alkylsulfinyl, C$_1$-C$_4$alkoxycarbonyl or C$_2$-C$_4$alkanoyl, and $X_2$ is preferably chlorine, cyano or methylsulfonyl. $X_2$ is particularly preferably halogen, in particular chlorine.

Preferred reactive radicals of the formula (3) are those in which X is halogen and T is as defined as preferred above.

Preferred reactive radicals of the formula (4) are those in which the two substituents $X_1$ are halogen, in particular chlorine or fluorine, and $X_2$ is halogen, in particular chlorine.

Particularly preferred reactive radicals of the formula (4) are those in which the two substituents $X_1$ are fluorine or chlorine and $X_2$ is chlorine.

The reactive dyes of the formulae (1a), (1b) and (1c) preferably contain as fibre-reactive groups a reactive radical of the formulae (2a) to (2g), or a reactive radical of the formula (3) or (4) in which R' is hydrogen or C$_1$-C$_4$alkyl which is unsubtituted or substituted by hydroxyl, sulfo, sulfato, carboxyl or cyano, X, $X_1$ and $X_2$ are halogen and T is halogen, hydroxyl, sulfo, C$_1$-C$_4$alkoxy, C$_1$-C$_4$alkylthio, C$_1$-C$_4$alkylsulfonyl, phenylsulfonyl, morpholino or substituted or unsubstituted amino, or T is a fibre-reactive radical of the formulae (5a) to (5f), in which the reactive radicals of the formulae (2a) to (2g), (3) and (4) are as defined and as preferred above.

C$_1$-C$_4$Alkyl R$_1$ is methyl, ethyl, propyl, isopropyl, butyl, isobutyl, sec-butyl or tert-butyl, in particular methyl.

R$_2$ is preferably cyano or carbamoyl.

Substituents of the C$_1$-C$_{12}$alkyl radicals R$_3$ and R$_3$' are, for example, hydroxyl, sulfo, sulfato, reactive radicals of the halotriazine or halopyrimidine series, in particular reactive radicals of the abovementioned formulae (3) and (4), and phenyl or naphthyl, in which the phenyl and naphthyl radicals are unsubstituted or further substituted by C$_1$-C$_4$alkyl, C$_1$-C$_4$alkoxy, C$_2$-C$_4$alkanoylamino, halogen or sulfo. The radicals R$_3$ and R$_3$' preferably contain no reactive group.

The radicals B, R$_3$ and R$_3$' can be interrupted by oxygen, for example by 1 to 3, in particular 1 or 2, —O— radicals.

The radical B is preferably C$_2$-C$_8$alkylene, which is unsubstituted or substituted by hydroxyl, sulfo or sulfato and may be interrupted by 1 to 3, in particular 1 or 2, —O— radicals.

The radical B is particularly preferably $C_2$-$C_6$alkylene, in particular 1,2-ethylene, 1,3-propylene or 1,6-hexylene.

The radicals $R_3$ and $R_3'$ are preferably independently of one another hydrogen or $C_1$-$C_{12}$alkyl which is unsubstituted or substituted by hydroxyl, sulfo or sulfato and, with the exception of methyl, may be interrupted by oxygen.

The radicals $R_3$ and $R_3'$ are particularly preferably independently of one another hydrogen or $C_1$-$C_8$alkyl which is unsubstituted or substituted by hydroxyl, sulfo or sulfato and, with the exception of methyl, may be interrupted by 1 to 3, in particular 1 or 2, —O— radicals.

The radicals $R_3$ and $R_3'$ preferably have identical meanings.

Examples of radicals $R_3$ and $R_3'$ are methyl, ethyl, propyl, isopropyl, butyl, isobutyl, sec-butyl, tert-butyl or straight-chain or branched pentyl, hexyl or octyl, 2-hydroxyethyl, 3-hydroxypropyl, 2-sulfatoethyl, 3-sulfatopropyl, 2-sulfoethyl, 3-sulfopropyl, 2-methoxyethyl, 3-methoxypropyl, and radicals of the formulae —$(CH_2)_2$—O—$(CH_2)_2$—OH and —$(CH_2)_2$—O—$(CH_2)_2$—$OSO_3H$.

The dyes of the formulae (1a), (1b) and (1c) preferably in each case contain at least one sulfo or sulfato group, in particular at least one sulfo group. They particularly preferably contain 1 to 4, in particular 2 to 4, sulfo and/or sulfato groups; preferably 2 to 4 sulfo groups.

The radicals D and D' are preferably radicals of the benzene or naphthalene series or radicals of a monoazo dye which contains a diazo component of the benzene or naphthalene series and a coupling component of the benzene or naphthalene series, in which the benzene and naphthalene radicals mentioned are unsubstituted or substituted by $C_1$-$C_4$alkyl, $C_1$-$C_4$alkyl which is further substituted by hydroxyl or $C_1$-$C_4$alkoxy, $C_1$-$C_4$alkoxy, $C_2$-$C_4$alkanoylamino, halogen, sulfo or a reactive radical of the formulae (2a) to (2g), (3) or (4). The reactive radicals of the formulae (2a) to (2g), (3) and (4) are as defined and as preferred above.

D and D' particularly preferably independently of one another are a radical of the formula

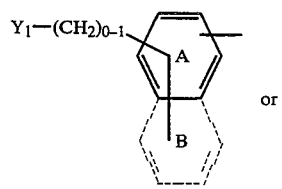
(6)

or

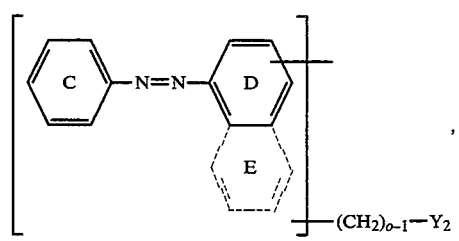
(7)

in which the rings A, B, C, D and E independently of one another are unsubstituted or substituted by $C_1$-$C_4$alkyl, $C_1$-$C_4$alkyl which is further substituted by hydroxyl or $C_1$-$C_4$alkoxy, $C_1$-$C_4$alkoxy, $C_2$-$C_4$alkanoylamino, halogen or sulfo and $Y_1$ and $Y_2$ independently of one another are a reactive radical of the formulae (2a) to (2g), (3) or (4). The reactive radicals of the formula (2a) to (2g), (3) and (4) are as defined and as preferred above.

The radicals D and D' preferably have identical meanings.

Preferred dye mixtures are those of reactive dyes of the formulae (1a), (1b) and (1c) in which D and D' have identical meanings and $R_3$ and $R_3'$ have identical meanings.

Particularly preferred dye mixtures are those of reactive dyes of the formulae (1a), (1b) and (1c) in which D and D' have identical meanings and are a radical of the formula (6) or (7), $R_1$ is methyl, $R_2$ is cyano or carbamoyl, $R_3$ and $R_3'$ have identical meanings and are hydrogen or $C_1$-$C_{12}$alkyl which is unsubstituted or substituted by hydroxyl, sulfo or sulfato and, with the exception of methyl, may be interrupted by oxygen, and B is $C_2$-$C_6$alkylene.

Particularly preferred dye mixtures are mixtures which comprise a reactive dye of the formula (1a) together with a reactive dye of the formula (1b). The reactive dyes of the formulae (1a) and (1b) are as defined and as preferred above.

In principle, the individual dyes of the formulae (1a), (1b) and (1c), to which the present invention furthermore relates, can be obtained by, for example, liquid chromatographic separation. The reactive dye of the formula (1b) is of particular importance here.

The present invention furthermore relates to a process for the preparation of the dye mixtures according to the invention, which comprises diazotising at least one amine of the formulae D—$NH_2$ (8a) and D'—$NH_2$ (8b), in which D and D' are as defined above, and coupling the diazotisation product with a mixture which comprises a compound of the formula

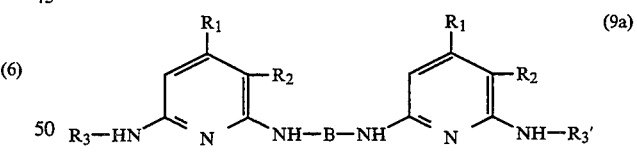
(9a)

together with at least one compound of the formulae

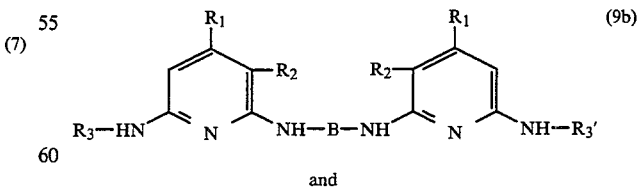
(9b)

and

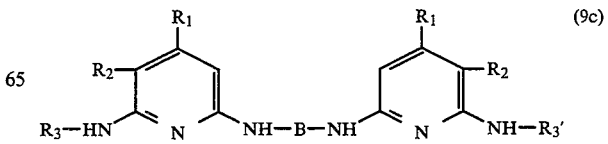
(9c)

in which $R_1$, $R_2$, $R_3$, $R_3'$ and B are as defined above, and if appropriate then carrying out a further conversion reaction.

The amines of the formulae (8a) and (8b) are as a rule diazotised by the action of nitrous acid in aqueous-mineral acid solution at a low temperature, for example 0° to 10° C., and the coupling with the mixture of the compounds of the formulae (9a), (9b) and (9c) is carded out at an acid or neutral to weakly alkaline pH, in particular at a pH of 2 to 8.

The amines of the formula (8a) and (8b) are known or can be prepared analogously to known compounds.

A modified embodiment of the process comprises first preparing dyes which contain a precursor of the reactive radical and subsequently converting these into the final stage, for example by esterification or an addition reaction.

For example, dyes in which Z is a radical $HO-CH_2CH_2-$ can be prepared and these products can be reacted with sulfuric acid such that the hydroxyl group is converted into the sulfato group. The sulfation of the hydroxyl group is carried out, for example, by reaction with concentrated sulfuric acid at about 0° C. to moderately elevated temperature.

The synthesis furthermore can be followed by elimination reactions. For example, reactive dyes which contain sulfatoethylsulfonyl radicals can be treated with a base, for example sodium hydroxide, the sulfatoethylsulfonyl radicals being converted into vinylsulfonyl radicals.

The mixtures of the reactive dyes of the formulae (1a), (1b) and (1c) in principle can be prepared by starting from corresponding mixtures of precursors or intermediates for dyes which contain fibre-reactive radicals, or introducing these fibre-reactive radicals into intermediates which have a dye character and are suitable for this purpose.

The mixtures of the compounds of the formulae (9a), (9b) and (9c) can be obtained by reacting a compound of the formula

with amines of the formulae

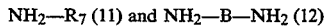

$NH_2-R_7$ (11) and $NH_2-B-NH_2$ (12)

and if appropriate subsequently carrying out a further conversion reaction, in which B, $R_1$ and $R_2$ are as defined above and $R_7$ is as defined for $R_3$ and $R_3'$.

The reaction is carried out, for example, at a temperature of about 70° to 130° C., in particular 70° to 90° C., in a solvent, for example N,N-diethylaniline, triethylamine, higher alcohols or ketones, or the amines of the formulae (11) and (12) are themselves used as solvents. The reaction is carded out in the presence of a base, and a suitable solvent can itself function as the base, or a base, for example sodium carbonate or potassium carbonate, is added.

The chlorine atoms of the compound of the formula (10) can be replaced in stages by suitable choice of the reaction conditions, which allows isolation of the individual monoor disubstitution products.

The chlorine atom in the para-position relative to the radical $R_2$ is thus chiefly removed in the first step at a lower temperature, for example 10° to 50° C., while the chlorine atom in the ortho-position relative to the radical $R_2$ is removed in a second step at a higher temperature, for example 70° to 120° C.

If the amines of the formula (11) and (12) thus are not added together but in succession, either the compound of the formula (9b) or the compound of the formula (9c) can be obtained as the main product. It has proved advantageous here to isolate the monosubstituted intermediate obtained after the reaction of the first amine in the first step at a lower temperature, and then to carry out the second step, the reaction of the second amine at a higher temperature.

If the amine of the formula (11) is therefore added in the first step at lower temperature and the amine of the formula (12) is added in the second step at a higher temperature, the compound of the formula (9b) is obtained as the main compound. If the amines are employed in the reverse sequence, the compound of the formula (9c) is obtained as the main compound.

The compound of the formula (9a) is as a rule a constituent of the resulting mixture, regardless of the sequence of addition of the amines of the formulae (11) and (12).

The compounds of the formulae (10), (11) and (12) are known or can be prepared analogously to known compounds.

The dyes of formulae (1a), (1b) and (1c) which contain a sulfo group or a sulfato group are present either in the form of their free acid or preferably as salts thereof.

Examples of suitable salts are the alkali metal salts, alkaline earth metal salts or ammonium salts or the salts of an organic amine. Examples are the sodium salts, lithium salts, potassium salts or ammonium salts or the salt of mono, di- or triethanolamine.

The dye mixtures according to the invention are suitable for dyeing and printing widely varying materials, such as fibre materials containing hydroxyl groups or nitrogen. Examples are silk, leather, wool, polyamide fibres and polyurethanes, in particular all types of cellulosic fibre materials.

Such cellulosic fibre materials are, for example, naturally occurring cellulose fibres, such as cotton, linen and hemp, as well as cellulose and regenerated cellulose. The dye mixtures according to the invention are also suitable for dyeing or printing fibres which contain hydroxyl groups and are contained in blend fabrics, for example blends of cotton with polyester fibres or polyamide fibres. The dye mixtures according to the invention are particularly suitable for dyeing or printing cellulosic fibre material or, in particular, naturally occurring or synthetic polyamide fibre materials.

The dye mixtures according to the invention can be applied to the fibre material and fixed on the fibre in various ways, in particular in the form of aqueous dye solutions and printing pastes. They are suitable both for the exhaust method and for dyeing by the pad dyeing method, in which the goods are impregnated with aqueous dye solutions, which may contain salts, and the dyes are fixed, if appropriate under the action of heat, after treatment with an alkali or in the presence of alkali. They are particularly suitable for the so-called cold pad-batch process, in which the dye is applied on the padder together with the alkali and is then fixed by storage at room temperature for several hours. After fixing, the dyeings or prints are rinsed thoroughly with cold and hot water, if appropriate with addition of a dispersing agent which promotes diffusion of the non-fixed portions.

The dye mixtures according to the invention are distinguished by a high reactivity, good fixing capacity and very good build-up capacity. They can therefore be employed by the exhaust dyeing process at low dyeing tempertures, and require only short steaming times in the pad-steam process. The degrees of fixing are high and the non-fixed portions can easily be washed off, the difference between the degree of exhaustion and degree of fixing being remarkably small, i.e. the soaping loss is very low. The dye mixtures according to the invention are also particularly suitable for printing, in particular on cotton, but also for printing fibres containing nitrogen, for example wool or silk or blend fabrics which comprise wool or silk.

The dyeings and prints produced with the dye mixtures according to the invention have a high tinctoffal strength and a high fibre-dye bond stability both in the acid and in the alkaline range, and furthermore a good light-fastness and very good wet-fastness properties,

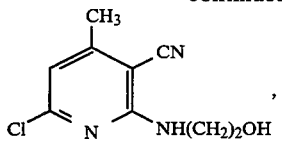

are obtained, the ratio of the compound of the formula (101) to the compound of the formula (102) being 3:1.

180 parts of the mixture of the compounds of the formulae (101) and (102) obtained as described are introduced into 685 parts of triethylamine and the mixture is refluxed. 31.5 parts of 1,3-diaminopropane are slowly added dropwise and the mixture is stirred under reflux for a further 5 hours. When the reaction has ended, 45 parts of sodium carbonate are sprinkled in and the triethylamine is distilled off. The resulting residue is discharged onto 3000 parts of ice-water and the resulting precipitate is filtered off and washed with water. After drying, 160 parts of a mixture of the compounds of the formulae

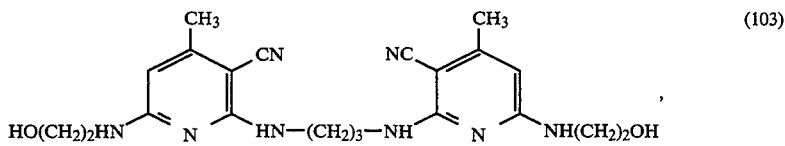

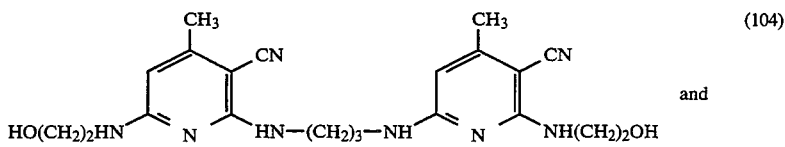

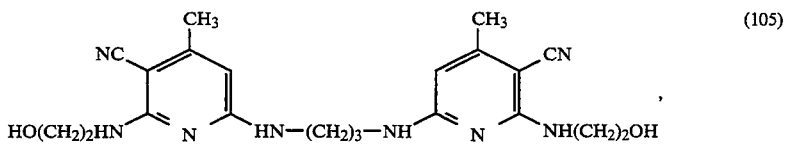

such as fastnesses to washing, water, sea-water, cross-dyeing and perspiration, as well as a good fastness to pleating, fastness to ironing and fastness to rubbing.

The following examples serve to illustrate the invention. The temperatures are stated in degrees Celsius and parts and percentages are by weight, unless stated otherwise. Parts by weight bear the same relationship to parts by volume as the kilogram to the litre.

Example 1: 187 parts of 2,6-dichloro-3-cyano-4-methylpyfidine are introduced into 427 parts of ethanolamine at a temperature of 20° to 30° C. The mixture is stirred at 20° to 30° C. for 2 hours. The clear brown solution is discharged onto 3000 parts of ice-water. The resulting precipitate is filtered off, washed with water and dried.

180 parts of a mixture of the compounds of the formulae

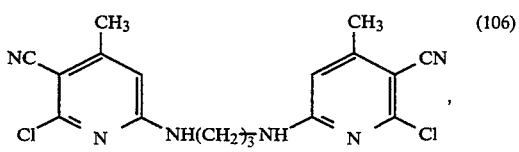

are obtained, the content of the compound of the formula (103) being about 60%, that of the compound of the formula (104) about 35% and that of the compound of the formula (105) about 5 %.

Example 2: 187 parts of 2,6-dichloro-3-cyano-4-methyl-pyridine are introduced into 800 parts of triethylamine at a temperature of 40° to 50° C. 37 parts of 1,3-diaminopropane are added dropwise to this suspension and the mixture is subsequently stirred at 40° to 50° C. for a further 5 hours. A suspension which comprises the compounds of the formulae

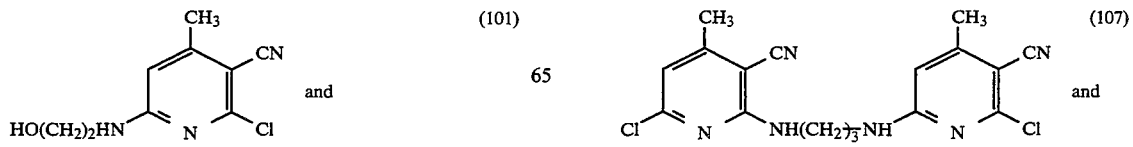

subsequently stirred at this temperature for a further 2 hours. The dark solution is cooled to room temperature and discharged into 6000 parts of water. The resulting suspension is filtered off and washed with water. After drying, about 150 parts of a mixture of the compounds of the formulae

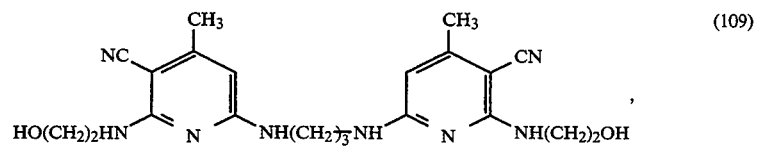 (109)

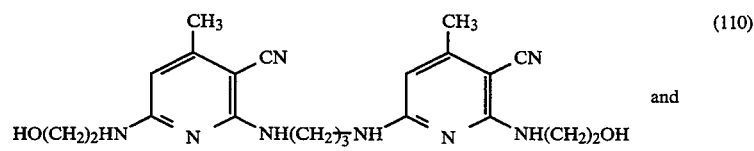 (110)

and

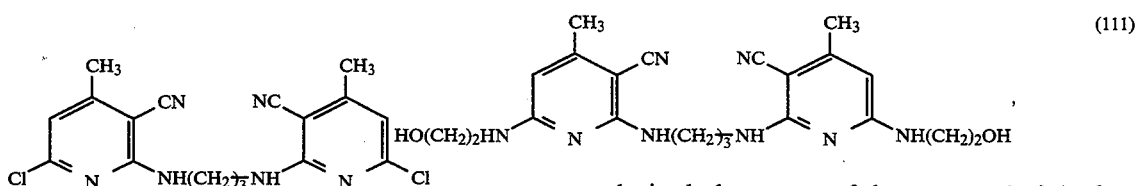 (111)

(108)

is obtained, the content of the compound of the formula (106) being about 60%, that of the compound of the formula (107) about 35% and that of the compound of the formula (108) about 5%.

500 parts of ethanolamine are added to the suspension thus obtained. The temperature is then increased to the reflux temperature and triethylamine is distilled off. During removal of the triethylamine by distillation, a further 500 parts of ethanolamine are added so that the suspension does not become too thick. When an internal temperature of 115° C. has been reached, the mixture is are obtained, the content of the compound of the formula (109) being about 60%, that of the compound of the formula (110) about 35% and that of the compound of the formula (111) about 5 %.

Examples 3 to 15: Corresponding mixtures of pyridine compounds which comprise the pyridine compounds shown in column 2 of the following Table 1 as the main component can be obtained analogously to Example 1. The mixtures comprise three components, which differ only in that the cyano or carbamoyl group is bonded to the particular pyridine ring in the 3- or in the 5-position.

TABLE 1

| Example | Pyridine compound |
|---|---|
| 3 | HO(CH₂)₂HN–[pyridine(CH₃)(CN)]–HN—(CH₂)₂—NH–[pyridine(CH₃)(NC)]–NH(CH₂)₂OH |
| 4 | HO₃SO(CH₂)₂HN–[pyridine(CH₃)(CONH₂)]–HN—(CH₂)₂—NH–[pyridine(CH₃)(H₂NOC)]–NH(CH₂)₂OSO₃H |
| 5 | HO₃SO(CH₂)₂HN–[pyridine(CH₃)(CN)]–HN—(CH₂)₂—NH–[pyridine(CH₃)(NC)]–NH(CH₂)₂OSO₃H |
| 6 | HO₃SO(CH₂)₃HN–[pyridine(CH₃)(CONH₂)]–HN—(CH₂)₂—NH–[pyridine(CH₃)(H₂NOC)]–NH(CH₂)₃OSO₃H |

TABLE 1-continued

| Example | Pyridine compound |
|---|---|
| 7 | HO$_3$SO(CH$_2$)$_3$HN—[4-CH$_3$, 3-CN pyridin-2-yl]—HN—(CH$_2$)$_4$—NH—[4-CH$_3$, 3-CN pyridin-2-yl]—NH(CH$_2$)$_3$OSO$_3$H |
| 8 | HO$_3$SO(CH$_2$)$_2$HN—[4-CH$_3$, 3-CONH$_2$ pyridin-2-yl]—HN—(CH$_2$)$_3$—NH—[4-CH$_3$, 3-CONH$_2$ pyridin-2-yl]—NH(CH$_2$)$_2$OSO$_3$H |
| 9 | H$_3$CCH$_2$HN—[4-CH$_3$, 3-CN pyridin-2-yl]—HN—(CH$_2$)$_2$—NH—[4-CH$_3$, 3-CN pyridin-2-yl]—NHCH$_2$CH$_3$ |
| 10 | HO(CH$_2$)$_2$O(CH$_2$)$_2$HN—[4-CH$_3$, 3-CN pyridin-2-yl]—HN—(CH$_2$)$_3$—NH—[4-CH$_3$, 3-CN pyridin-2-yl]—NH(CH$_2$)$_2$O(CH$_2$)$_2$OH |
| 11 | HO(CH$_2$)$_3$HN—[4-CH$_3$, 3-CN pyridin-2-yl]—HN—(CH$_2$)$_4$—NH—[4-CH$_3$, 3-CN pyridin-2-yl]—NH(CH$_2$)$_3$OH |
| 12 | HO(CH$_2$)$_2$HN—[4-CH$_3$, 3-CN pyridin-2-yl]—HN—(CH$_2$)$_3$O(CH$_2$)$_3$O(CH$_2$)$_3$—NH—[4-CH$_3$, 3-CN pyridin-2-yl]—NH(CH$_2$)$_2$OH |
| 13 | H$_3$C(CH$_2$)$_4$HN—[4-CH$_3$, 3-CONH$_2$ pyridin-2-yl]—HN—(CH$_2$)$_2$—NH—[4-CH$_3$, 3-CONH$_2$ pyridin-2-yl]—NH(CH$_2$)$_4$CH$_3$ |
| 14 | HO(CH$_2$)$_3$HN—[4-CH$_3$, 3-CONH$_2$ pyridin-2-yl]—HN—(CH$_2$)$_2$—NH—[4-CH$_3$, 3-CONH$_2$ pyridin-2-yl]—NH(CH$_2$)$_3$OH |
| 15 | H$_3$C(CH$_2$)$_4$HN—[4-CH$_3$, 3-CN pyridin-2-yl]—HN—(CH$_2$)$_4$—NH—[4-CH$_3$, 3-CN pyridin-2-yl]—NH(CH$_2$)$_4$CH$_3$ |

Example 16: 24.4 parts of aniline-2-$\beta$-sulfatoethylsulfonyl-5-sulfonic acid in 200 parts of an ice-water suspension are acidified with 15 parts of concentrated aqueous hydrochloric acid and diazotised with 13.6 parts of a 5 normal sodium nitrite solution. The mixture is subsequently stirred at a temperature of about 5° C. for one hour and excess nitrous acid is then destroyed with amidosulfonic acid. The diazonium salt solution thus prepared is then allowed to run slowly, at a pH of 4 to 5, into a suspension which contains 8 parts of a mixture of the compounds of the formulae

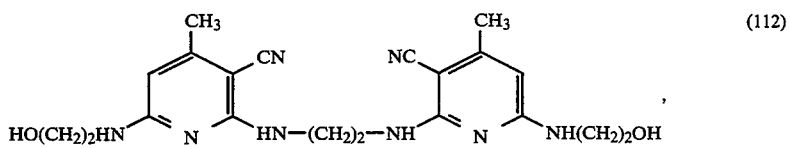
(112)

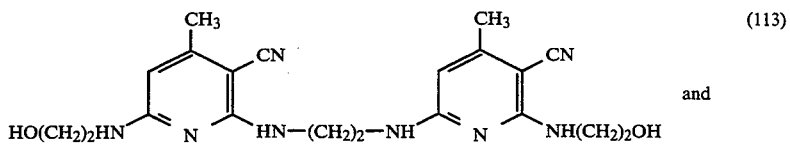
(113)
and

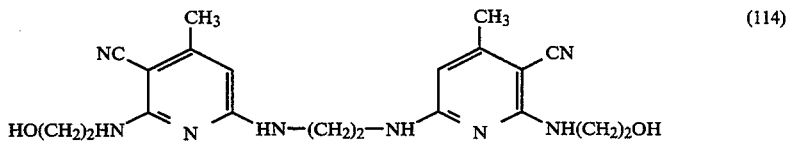
(114)

in 100 parts of water, the ratio of the compounds of the formulae (112), (113) and (114) being about 12:7:1. The pH is adjusted to 6 to 7 by addition of a sodium carbonate solution. The mixture is subsequently stirred for 2 hours until coupling is complete. The resulting product is then subjected to reverse osmosis and freeze dried. A mixture is obtained which comprises the dyes, shown in the form of the free acids, of the formulae

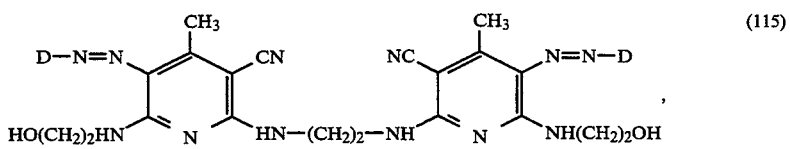
(115)

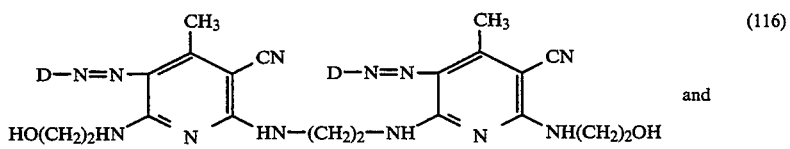
(116)
and

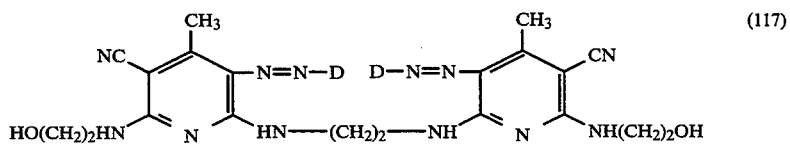
(117)

in which, in the compounds of the formulae (115), (116) and (117), the radical D is in each case a radical of the formula

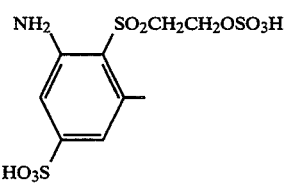

and the ratio of the compounds of the formulae (115), (116) and (117) is about 12:7:1.

The mixture of the dyes of the formulae (115), (116) and (117) dyes cotton and wool in brilliant orange shades.

Example 17: 22 parts of 2-naphthylamino-1-sulfo-6-β-sulfatoethyl sulfone in 200 parts of an ice-water suspension are acidified with 15 parts of concentrated aqueous hydrochloric acid and diazotised with 13.6 parts of a 5 normal sodium nitrite solution. The mixture is subsequently stirred at a temperature of about 5° C. for one hour and excess nitrous acid is then destroyed with amidosulfonic acid. The diazonium salt solution thus prepared is then allowed to run slowly, at a pH of 4 to 5, into a suspension which contains 7.5 parts of a mixture of the compounds of the formulae (112), (113) and (114) in 100 parts of water, the ratio of the compounds of the formulae (112), (113) and (114) being about 12:7:1. The pH is brought to 6 to 7 by addition of a sodium carbonate solution. The mixture is subsequently stirred for 2 hours until coupling is complete. The product obtained is then subjected to reverse osmosis and freeze dried. A mixture is obtained which comprises the dyes, shown in the form of the free acids, of the formulae

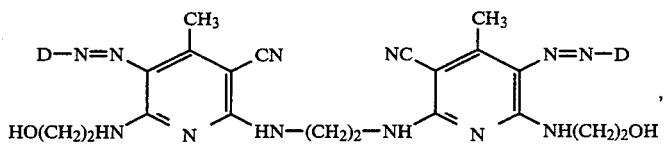

(118)

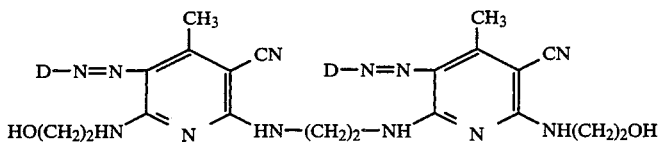

(119)

and

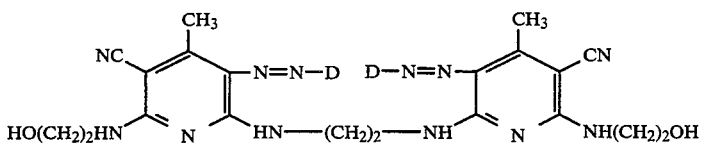

(120)

in which, in the compounds of the formulae (118), (119) and (120), the radical D is in each case a radical of the formula

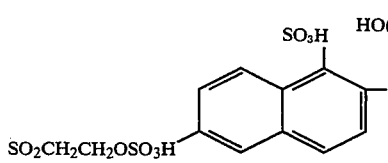

and the ratio of the compounds of the formulae (118), (119) and (120) is about 12:7:1.

The mixture of the dyes of the formulae (118), (119) and (120) dyes cotton and wool in brilliant orange shades.

Example 18: 18 parts of 5-(2',3'-dibromopropionamido)aniline-2-sulfonic acid in 200 parts of an ice-water suspension are acidified with 15 parts of concentrated aqueous hydrochloric acid and diazotised with 13.6 parts of a 5 normal sodium nitrite solution. The mixture is subsequently stirred at a temperature of about 5° to 15° C. for one hour and excess nitrous acid is then destroyed with amidosulfonic acid. The diazonium salt solution thus prepared is then allowed to run slowly, at a pH of 4 to 5, into a suspension which contains 7.4 parts of a mixture of the compounds of the formulae (112), (113) and (114) in 100 parts of water, the ratio of the compounds of the formulae (112), (113) and (114) being about 12:7:1. The pH is adjusted to 6 to 7 by addition of a sodium carbonate solution. The mixture is subsequently stirred for 2 hours until coupling is complete. The resulting product is then subjected to reverse osmosis and freeze-dried. A mixture is obtained which comprises the dyes, shown in the form of the free acids, of the formulae

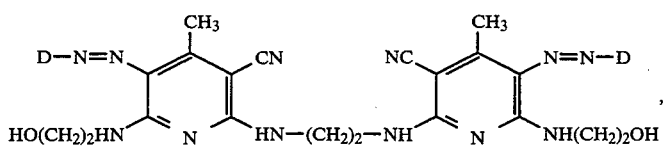

(121)

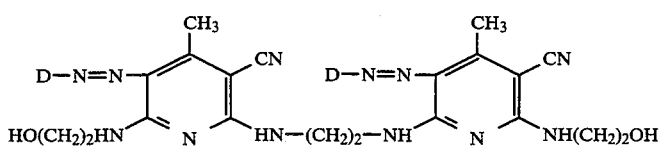

(122)

and

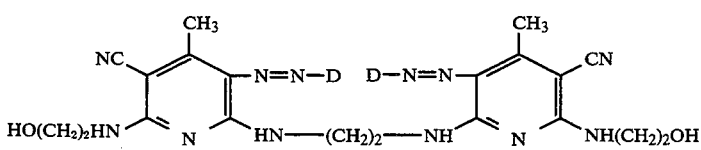

(123)

in which, in the compounds of the formula (121), (122) and (123), the radical D is in each case a radical of the formula

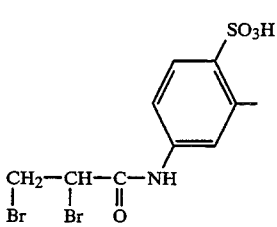

and the ratio of the compounds of the formulae (121), (122) and (123) is about 12:7:1.

The mixture of the dyes of the formulae (121), (122) and (123) dyes cotton and wool in brilliant yellow shades.

Example 19: 18 parts of 4-(2',3'-dibromopropionamido)aniline-2-sulfonic acid in 200 parts of an ice-water suspension are acidified with 15 parts of concentrated aqueous hydrochloric acid and diazotised with 13.6 parts of a 5 normal sodium nitrite solution. The mixture is subsequently stirred at a temperature of about 5° to 15° C. for one hour and excess nitrous acid is then destroyed with amidosulfonic acid. The diazonium salt solution thus prepared is then allowed to run slowly, at a pH of 4 to 5, into a suspension which contains 7.4 parts of a mixture of the compounds of the formulae (112), (113) and (114) in 100 parts of water, the ratio of the compounds of the formulae (112), (113) and (114) being about 12:7:1. The pH is brought to 6 to 7 by addition of a sodium carbonate solution. The mixture is subsequently stirred for 2 hours until coupling is complete. The resulting product is then subjected to reverse osmosis and freeze dried. A mixture is obtained which comprises the dyes, shown in the form of the free acids, of the formulae

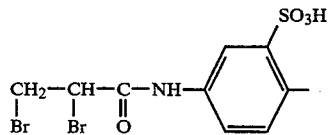

and the ratio of the compounds of the formulae (124), (125) and (126) is about 12:7:1.

The mixture of the dyes of the formulae (124), (125) and (126) dyes cotton and wool in brilliant orange shades.

Examples 20 to 65: Corresponding mixtures of reactive dyes which comprise the reactive dyes shown in column 2 in the following Table 2 as the main component can be obtained analogously to Examples 16 to 19.

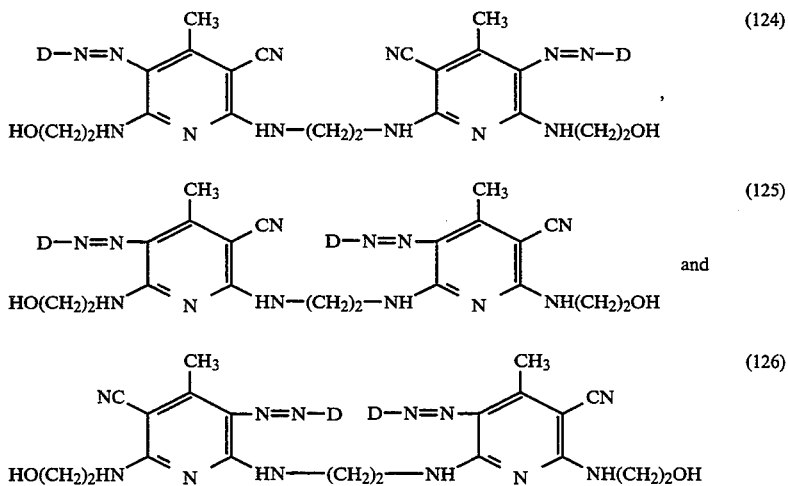

in which, in the compounds of the formulae (124), (125) and (126), the radical D is in each case a radical of the formula The mixtures comprise three components, which differ only in that the cyano or carbamoyl group is bonded to the particular pyridine ring in the 3- or in the 5-position. The reactive dye mixtures shown in column 2 dye cotton and wool in the colour shades shown in column 3.

TABLE 2

| Example | Reactive dye | Colour shade |
|---|---|---|
| 20 | ![dye structure with HO₃SO(CH₂)₂O₂S-phenyl-N=N-pyridine(CH₃, CONH₂, HO₃SO(CH₂)₂HN)-NH-(CH₂)₂-NH]₂ | Yellow |
| 21 | ![dye structure with HO₃SO(CH₂)₂O₂S-phenyl-N=N-pyridine(CH₃, CN, HO₃SO(CH₂)₂HN)-NH-(CH₂)₂-NH]₂ | Yellow |

TABLE 2-continued

| Example | Reactive dye | Colour shade |
|---|---|---|
| 22 | $[HO_3SO(CH_2)_2O_2S-C_6H_4-N=N-\text{pyridine}(CH_3)(CONH_2)(HO_3SO(CH_2)_3HN)-]_2-NH-(CH_2)_2-NH$ | Yellow |
| 23 | $[HO_3SO(CH_2)_2O_2S-C_6H_4-N=N-\text{pyridine}(CH_3)(CN)(HO_3SO(CH_2)_3HN)-]_2-NH-(CH_2)_4-NH$ | Yellow |
| 24 | $[HO_3SO(CH_2)_2O_2S-C_6H_4-N=N-\text{pyridine}(CH_3)(CONH_2)(HO_3SO(CH_2)_2HN)-]_2-NH-(CH_2)_3-NH$ | Yellow |
| 25 | $[HO_3SO(CH_2)_2O_2S-C_6H_4-N=N-\text{pyridine}(CH_3)(CN)(HO_3S(CH_2)_2HN)-]_2-NH-(CH_2)_2-NH$ | Yellow |
| 26 | $[HO_3SO(CH_2)_2O_2S-C_6H_4-N=N-\text{pyridine}(CH_3)(CN)(HO_3SO(CH_2)_2HN)-]_2-NH-(CH_2)_2-NH$ (meta) | Yellow |
| 27 | $[HO_3SO(CH_2)_2SO_2(CH_2)_2NHOC-C_6H_4-N=N-\text{pyridine}(CH_3)(CN)(HO_3SO(CH_2)_2HN)-]_2-NH-(CH_2)_2-NH$ | Yellow |
| 28 | $[HO_3SO(CH_2)_2SO_2(CH_2)_3NHOC-C_6H_4-N=N-\text{pyridine}(CH_3)(CN)(HO_3SO(CH_2)_2HN)-]_2-NH-(CH_2)_2-NH$ | Yellow |

TABLE 2-continued

| Example | Reactive dye | Colour shade |
|---|---|---|
| 29 | [HO₃SO(CH₂)₂SO₂(CH₂)₂O(CH₂)₂NHOC–C₆H₄–N=N–C(pyridine: CH₃, CN, HO₃SO(CH₂)₂NH)]–NH(CH₂)₂NH]₂ | Yellow |
| 30 | [HO₃SO(CH₂)₂SO₂(CH₂)₂NHOC–C₆H₄–N=N–C(pyridine: CH₃, CN, HO₃SO(CH₂)₂NH)]–NH(CH₂)₂NH]₂ | Orange |
| 31 | [HO₃SO(CH₂)₂SO₂(CH₂)₃NHOC–C₆H₄–N=N–C(pyridine: CH₃, CN, HO₃SO(CH₂)₂NH)]–NH(CH₂)₂NH]₂ | Orange |
| 32 | [HO₃SO(CH₂)₂SO₂(CH₂)₂NHOC–C₆H₃(SO₃H)–N=N–C(pyridine: CH₃, CN, HO(CH₂)₂NH)]–NH(CH₂)₄NH]₂ | Orange |
| 33 | [HO₃SO(CH₂)₂O₂S–C₆H₄–N=N–C(pyridine: CH₃, CONH₂, HO₃SO(CH₂)₃HN)]–NH(CH₂)₄NH]₂ | Yellow |
| 34 | [HO₃SO(CH₂)₂SO₂(CH₂)₂NHOC–C₆H₄–N=N–C(pyridine: CH₃, CONH₂, HO₃SO(CH₂)₃HN)]–NH(CH₂)₄NH]₂ | Yellow |
| 35 | [HO₃S–C₆H₃(SO₂(CH₂)₂OSO₃H)–N=N–C(pyridine: CH₃, CN, H₃CCH₂NH)]–NH(CH₂)₂NH]₂ | Orange |

TABLE 2-continued
| Example | Reactive dye | Colour shade |
|---|---|---|
| 36 | 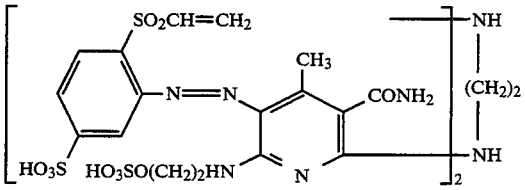 | Orange |
| 37 | 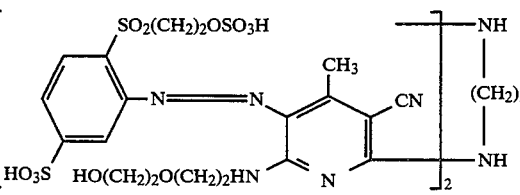 | Orange |
| 38 | 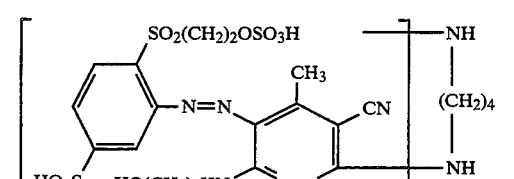 | Orange |
| 39 | 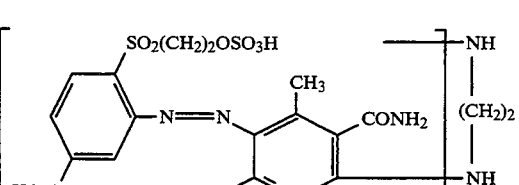 | Orange |
| 40 | 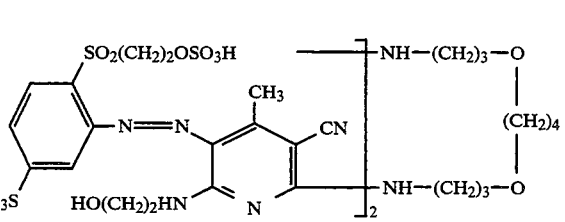 | Orange |
| 41 | 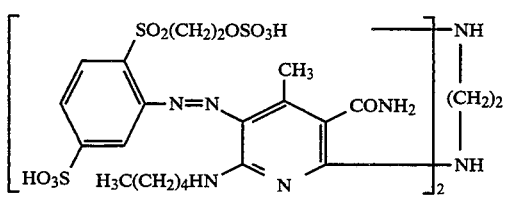 | Orange |
| 42 | 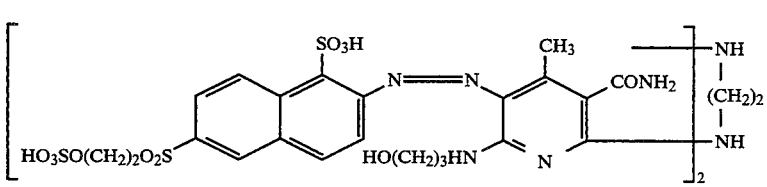 | Orange |

TABLE 2-continued

| Example | Reactive dye | Colour shade |
|---|---|---|
| 43 | (structure) | Orange |
| 44 | (structure) | Orange |
| 45 | (structure) | Orange |
| 46 | (structure) | Yellow |
| 47 | (structure) | Yellow |
| 48 | (structure) | Yellow |
| 49 | (structure) | Orange |

TABLE 2-continued
| Example | Reactive dye | Colour shade |
|---|---|---|
| 50 | 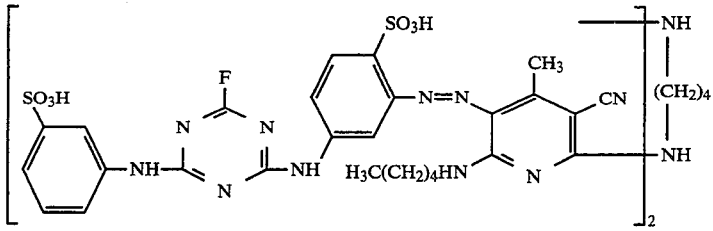 | Yellow |
| 51 | 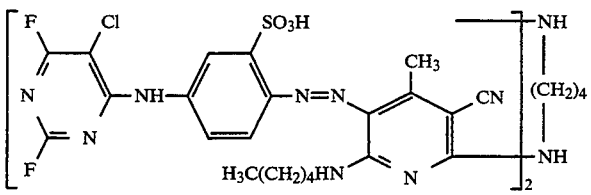 | Orange |
| 52 | 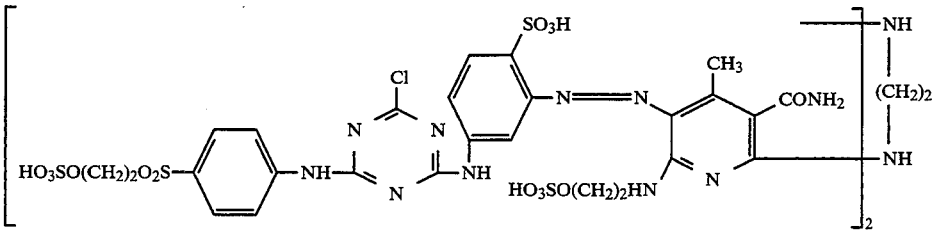 | Yellow |
| 53 | 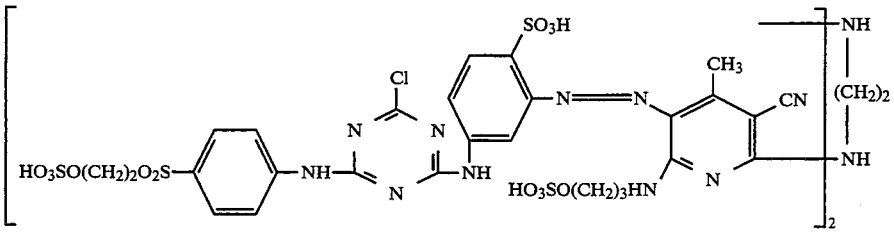 | Yellow |
| 54 | 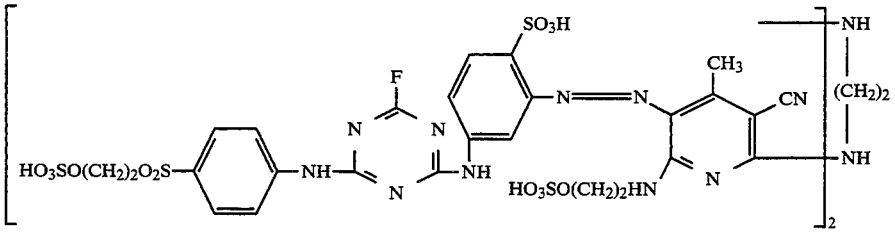 | Yellow |
| 55 | 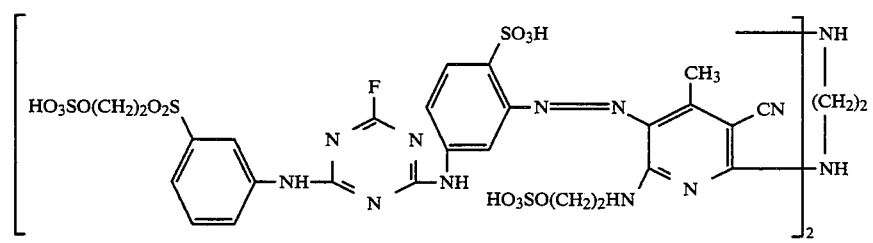 | Yellow |

TABLE 2-continued

| Example | Reactive dye | Colour shade |
|---------|--------------|--------------|
| 56 | (structure) | Orange |
| 57 | (structure) | Red |
| 58 | (structure) | Red |
| 59 | (structure) | Red |
| 60 | (structure) | Scarlet |
| 61 | (structure) | Claret |

TABLE 2-continued

| Example | Reactive dye | Colour shade |
|---------|--------------|--------------|
| 62 | | Claret |
| 63 | | Claret |
| 64 | | Red |
| 65 | | Red |

Dyeing instructions 2 parts of the reactive dye mixture obtained according to Example 16 are dissolved in 400 parts of water; 1500 parts of a solution containing 53 g of sodium chloride per litre are added. 100 parts of cotton fabric are introduced into this dyebath at 40° C. After 45 minutes, 100 parts of a solution containing 16 g of sodium hydroxide and 20 g of calcined sodium carbonate per litre are added. The temperature of the dyebath is kept at 40° C. for a further 45 minutes. The dyed goods are then rinsed, soaped at the boil with a nonionic detergent for a quarter of an hour, rinsed again and dried.

Printing instructions 3 parts of the reactive dye mixture obtained according to Example 16 are sprinkled into 100 parts of a stock thickener mixture comprising 50 parts of 5% sodium alginate thickener, 27.8 parts of water, 20 parts of urea, 1 part of sodium m-nitrobenzenesulfonate and 1.2 parts of sodium bicarbonate, while stirring rapidly. A cotton fabric is printed with the printing paste thus obtained and is dried, and the resulting printed material is steamed in saturated steam at 102° C. for 2 minutes. The printed fabric is then rinsed, soaped at the boil, if appropriate, and rinsed again, and then dried.

What is claimed is:

1. A dye mixture which comprises a reactive dye of the formula

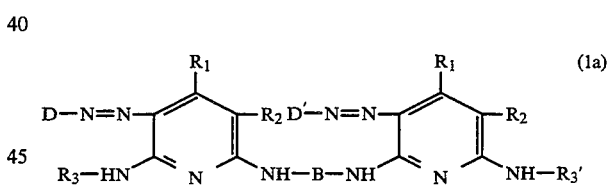

(1a)

together with at least one reactive dye of the formulae

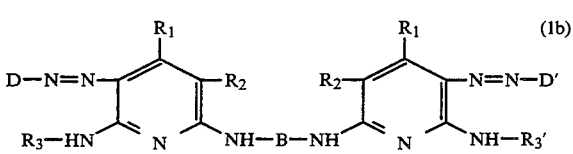

(1b)

and

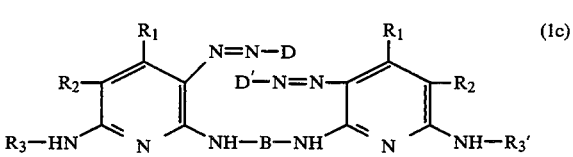

(1c)

in which D and D' independently of one another are the radical of a diazo component of the benzene or naphthalene series or the radical of a mono- or disazo dye, $R_1$ is $C_1$-$C_4$alkyl, $R_2$ is cyano, carbamoyl or sulfomethyl, $R_3$ and $R_3'$ independently of one another are hydrogen or $C_1$-$C_{12}$alkyl which is unsubstituted or substituted by hydroxyl, sulfo or sulfato and, with the exception of methyl, may be interrupted by oxygen and B is $C_2$-$C_{12}$alkylene which is substituted or unsubstituted and may be interrupted by oxygen, and the reactive dyes of the formulae (1a), (1b) and (1c) in each case contain at least one fibre-reactive radical bonded to the group D or D', wherein said fibre-reactive radical is a group of the formula $$SO_2-Z \qquad (2a)$$

  (2b)

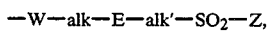  (2c)

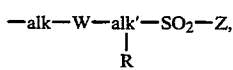  (2d)

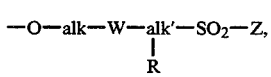  (2e)

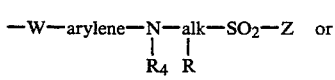  (2f)

$$-NH-CO-Z_1, \qquad (2g)$$

in which W is a group of the formula $-SO_2-NR_4-$, $-CONR_4$ or $-NR_4CO-$, $R_4$ is hydrogen, $C_1$-$C_4$alkyl which is unsubstituted or substituted by hydroxyl, sulfo, sulfato, carboxyl or cyano, or a radical of the formula

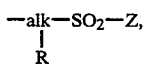

R is hydrogen, hydroxyl, sulfo, sulfato, carboxyl, cyano, halogen, $C_1$-$C_4$alkoxycarbonyl, $C_1$-$C_4$alkanoyloxy, carbamoyl or the group $-SO_2-Z$, Z is a group of the formula $-CH=CH_2$ or $-CH_2-CH_2-U_1$ and $U_1$ is a leaving group $Z_1$ is a group of the formula

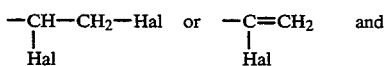

Hal is halogen, E is the radical $-O-$ or $-NR_5-$ and $R_5$ is hydrogen or $C_1$-$C_4$alkyl, alk and alk' independently of one another are $C_1$-$C_6$alkylene and arylene is a phenylene or naphthylene radical which is unsubstituted or substituted by sulfo, carboxyl, $C_1$-$C_4$alkyl, $C_1$-$C_4$alkoxy or halogen, or a fibre-reactive radical of the formula

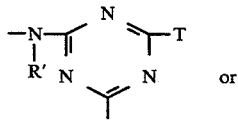  (3)

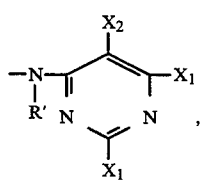  (4)

in which R' is hydrogen or $C_1$-$C_4$alkyl which is unsubstituted or substituted by hydroxyl, sulfo, sulfato, carboxyl or cyano, X, $X_1$ and $X_2$ are halogen and T is halogen, hydroxyl, sulfo, $C_1$-$C_4$alkoxy, $C_1$-$C_4$alkylthio, $C_1$-$C_4$alkylsulfonyl, phenylsulfonyl, morpholino or substituted or unsubstituted amino, or T is a fibre-reactive radical of the formula

  (5a)

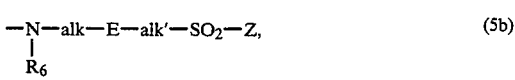  (5b)

  (5c)

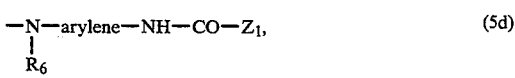  (5d)

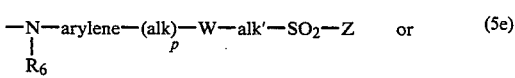  (5e)

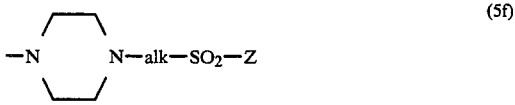  (5f)

in which R, $R_4$, E, W, Z, $Z_1$, alk, alk' and arylene are as defined above, $R_6$ is hydrogen or $C_1$-$C_4$alkyl and p is 0 or 1, and said dyes of the formulae (1a), (1b) and (1c) in each case contain at least one sulfo or sulfato group.

2. A dye mixture according to claim 1, in which B is $C_2$-$C_6$alkylene.

3. A dye mixture according to claim 1, in which $R_1$ is methyl.

4. A dye mixture according to claim 1, in which $R_2$ is cyano or carbamoyl.

5. A dye mixture according to claim 1, in which D and D' independently of one another are a radical of the formula

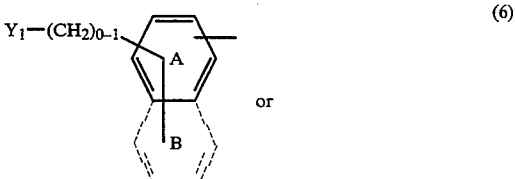  (6)

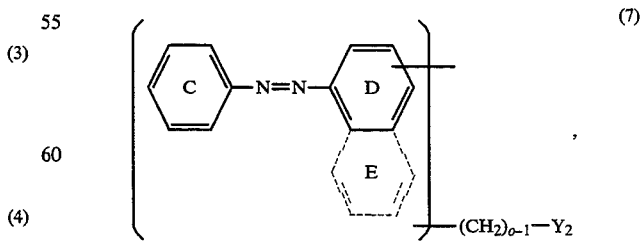  (7)

in which the rings A, B, C, D and E independently of one another are unsubstituted or substituted by $C_1$-$C_4$alkyl, $C_1$-$C_4$alkyl which is further substituted by hydroxyl or $C_1$-$C_4$alkoxy, $C_1$-$C_4$alkoxy, $C_2$-$C_4$alkanoylamino, halogen or sulfo and $Y_1$ and $Y_2$ independently of one another are a reactive radical of the formulae (2a) to (2g), (3) or (4).

6. A dye mixture according to claim 1, in which D and D' are identical and $R_3$ and $R_3'$ are identical.

7. A dye mixture according to claim 5, in which D and D' are identical and are a radical of the formula (6) or (7), $R_1$ is methyl, $R_2$ is cyano or carbamoyl, $R_3$ and $R_3'$ are identical and are hydrogen or $C_1$-$C_{12}$alkyl which is unsubstituted or substituted by hydroxyl, sulfo or sulfato and, with the exception of methyl, may be interrupted by oxygen and B is $C_2$-$C_6$alkylene.

8. A dye mixture according to claim 1, in which the dyes of the formulae (1a), (1b) and (1c) in each case contain at least one sulfo group.

9. A process for dyeing or printing fibre materials containing hydroxyl groups or nitrogen, which comprises the step of applying to the fibre material from a dye bath or printing paste a tinctorial amount of a dye mixture according to claim 1.

10. A process according to claim 9 wherein the fibre material is cellulosic fibre material, or naturally occurring or synthetic polyamide fibre material.

* * * * *